Patented Sept. 4, 1945

2,384,047

UNITED STATES PATENT OFFICE 2,384,047

MANUFACTURE OF ORGANIC NITROGEN COMPOUNDS

Arthur Ernest Wilder Smith, Norton-on-Tees, England, assignor to Imperial Chemical Industries Limited, a corporation of Great Britain No Drawing. Application July 8, 1942, Serial No. 450,141. In Great Britain March 31, 1941

2 Claims. (Cl. 260—644)

This invention relates to a new composition of matter and to a method of preparing it.

The new composition of matter of the present invention is 1:2-dinitro-ethane of the formula:

and having a melting point of 39° C.–40° C. and a boiling point under 5 mm. pressure of 135° C.

In accordance with the present invention the new product 1:2-dinitroethane is prepared by reacting nitrogen tetroxide with ethylene at a low temperature. The critical temperature of nitrogen tetroxide should not in any circumstances be exceeded.

It is desirable to use as low a temperature as possible, since the yield and purity of the 1:2-dinitroethane decreases as the temperature rises. Thus at atmospheric pressure, the yield at a temperature of −10° C. is greater than that at 15° C. and very much greater still than that at 60° C. Although nitrogen tetroxide freezes at −10° C. it will be evident that as soon as some ethylene has been dissolved in it or some reaction products have formed, the freezing point will be lowered and that the reaction may then be carried on if desired at a temperature below −10° C.

Atmospheric or super-atmospheric pressure may be employed.

Although the reaction may be carried out with the reactants in the vapour phase, the yield of 1:2-dinitroethane will be low, and may amount to only a trace at the higher temperatures. It is therefore preferred to operate with the nitrogen tetroxide in the liquid phase.

The nitrogen tetroxide should contain little or no nitric oxide, nitric acid or substances which would give rise to these compounds under the reaction conditions. Similarly the ethylene should contain little or no olefines and little or no alcohol, ether, or substances which would give rise to these compounds under the reaction conditions. As the content of these impurities in the initial reactants increases, the yield of 1:2-dinitroethane decreases.

Substances which are chemically inert under the reaction conditions while not harmful, do not serve any useful purpose, and are therefore better absent.

The invention will be illustrated by the following examples, but it is not limited thereto.

Example 1

Nitrogen tetroxide was first purified by distillation in a stream of oxygen over phosphorous pentoxide. Pure ethylene was then passed in a finely divided stream into the purified liquid nitrogen tetroxide, maintained by an ice bath at about 0° C. After about 30% of the theoretical amount of ethylene had been absorbed, the reaction rate appeared to fall off, and the passage of ethylene was discontinued. The excess of nitrogen tetroxide was then allowed to evaporate and a pale brown oil obtained as a residue. This oil was poured into ice water and crystallisation of 1:2-dinitroethane promoted by scratching. The resulting crystals were separated from the remaining oil by filtration and recrystallised from a mixture of benzene and petroleum ether (boiling point 60° C.–80° C.). White crystals were then obtained of melting point 39° C.–40° C., boiling point under 5 mm. pressure of 135° C. and molecular weight in glacial acetic acid, of 118±3. Its composition on analysis was found to be 20.2% carbon, 3.4% hydrogen, 23.4% nitrogen.

On solution in alkali, followed by addition of sodium nitrite and acidification with dilute sulphuric acid, a blood-red colouration was obtained, thus establishing that the substance was a primary nitrocompound.

On hydrolysis at 150° C. for 20 minutes with concentrated hydrochloric acid in a sealed tube, hydroxylamine was obtained in a yield of approximately 87% of that theoretically obtainable from 1:2-dinitroethane, thus establishing that both nitrogen atoms in the molecule are present as nitro groups.

Example 2

1000 grams of pure dry liquid nitrogen tetroxide were placed in a coiled reactor surrounded in a cooled methanol bath at 2° C. Pure dry ethylene was then passed into the liquid nitrogen tetroxide in a stream of fine bubbles over a period of two and a half hours until 34.2 litres had been absorbed. The reaction mixture was then withdrawn and the excess nitrogen tetroxide carefully removed by evaporation in the cold using a vessel of large capacity and wide exit line. Special care was taken towards the end of the evaporation to keep the boiler cool and prevent heating due to auto-catalytic decomposition of side products. The degassed mixture was then poured on to ice, cooled to −10° C. to −20° C. and stirred. Solid 1:2-dinitroethane was thereby thrown out of solution and was separated from the mother liquor by filtration. The yield of 1:2-dinitroethane was 43 grams of melting point 36° C. to 38° C. By recrystallisation from benzene, the melting point of the 1:2-dinitroethane was raised to 40° C.

*Example 3*

1000 grams of pure dry nitrogen tetroxide were placed in the coiled reactor, cooled to −11° C. Pure dry ethylene was then passed in as a stream of fine bubbles over a period of 6 hours until 13.3 litres had been absorbed. The reaction mixture was then treated in the manner described in Example 2. The yield of 1:2-dinitroethane was 22 grams and the melting point, after recrystallisation from benzene, was 40° C.

I am quite aware than in J. Russ. Phys. Chem. Ges. 49, 297, a greenish yellow oil boiling between 94° C.–96° C. under 5 mm. pressure was taken to be 1:2-dinitroethane. This statement, however, is incorrect.

I claim:

1. A process for the preparation of 1,2-dinitroethane which comprises adding substantially pure ethylene to substantially pure liquid nitrogen tetroxide at a temperature less than 15° C. until approximately 30% of the theoretical amount of ethylene has been added, and evaporating the excess nitrogen tetroxide at a low temperature.

2. A process for the preparation of 1,2-dinitroethane which comprises adding substantially pure ethylene to substantially pure liquid nitrogen tetroxide at a temperature less than 15° C. until approximately 30% of the theoretical amount of ethylene has been added, and evaporating the excess nitrogen tetroxide at a low temperature, said process being carried out under superatmospheric pressure.

ARTHUR ERNEST WILDER SMITH.